US011539620B2

(12) United States Patent
Lin et al.

(10) Patent No.: US 11,539,620 B2
(45) Date of Patent: Dec. 27, 2022

(54) ANOMALY FLOW DETECTION DEVICE AND ANOMALY FLOW DETECTION METHOD

(71) Applicant: National Taiwan University, Taipei (TW)

(72) Inventors: Phone Lin, Taipei (TW); Xin-Xue Lin, Taipei (TW); En-Hau Yeh, Taipei (TW); Chia-Peng Lee, Taipei (TW); Char-Dir Chung, Taipei (TW)

(73) Assignee: National Taiwan University, Taipei (TW)

( * ) Notice: Subject to any disclaimer, the term of this patent is extended or adjusted under 35 U.S.C. 154(b) by 143 days.

(21) Appl. No.: 17/129,177

(22) Filed: Dec. 21, 2020

(65) Prior Publication Data
US 2021/0367885 A1 Nov. 25, 2021

(30) Foreign Application Priority Data

May 22, 2020 (TW) .................................. 109117089

(51) Int. Cl.
*H04L 12/28* (2006.01)
*H04L 45/74* (2022.01)
(Continued)

(52) U.S. Cl.
CPC ............ *H04L 45/74* (2013.01); *G06N 20/00* (2019.01); *H04L 43/0876* (2013.01); *H04L 43/12* (2013.01)

(58) Field of Classification Search
CPC ..... H04L 45/74; H04L 43/12; H04L 43/0876; G06N 20/00
See application file for complete search history.

(56) References Cited

U.S. PATENT DOCUMENTS 11,115,289 B1 * 9/2021 Haefner .............. H04L 63/1425
2013/0269033 A1 10/2013 Amaya Calvo et al.
(Continued)

FOREIGN PATENT DOCUMENTS

CN 105703963 B * 4/2017 ............. H04L 12/26
CN 107733921 A 2/2018
(Continued)

OTHER PUBLICATIONS

Paulauskas et al., "Local outlier factor use for the network flow anomaly detection", Security and Communication Networks, 2015, vol. 8, pp. 4203-4212, John Wiley & Sons, Ltd.
(Continued)

*Primary Examiner* — Chi H Pham
*Assistant Examiner* — Elisabeth Benoit Magloire
(74) *Attorney, Agent, or Firm* — Chen Yoshimura LLP

(57) ABSTRACT

An anomaly flow detection device and an anomaly flow detection method thereof are provided. The device can retrieve a plurality of training data transmitted between a monitored network and an external network, preprocess a plurality of packet headers of the pluralities of training data to obtain a plurality of training feature vectors, construct a flow recognition model with an unsupervised learning method, input the pluralities of training feature vectors to the flow recognition model to train the flow recognition model, retrieve a plurality of testing data transmitted between the monitored network and the external network, preprocess a plurality of packet headers of the pluralities of testing data to obtain a plurality of testing feature vectors, input the pluralities of testing feature vectors to the flow recognition model to identify whether the pluralities of packet headers of the pluralities of testing data are normal or abnormal, and determine the flow of the monitored network is abnormal (Continued)

according to the recognition result of the flow recognition model.

8 Claims, 6 Drawing Sheets

(51) Int. Cl.
  *H04L 43/0876* (2022.01)
  *H04L 43/12* (2022.01)
  *G06N 20/00* (2019.01)

(56) References Cited

U.S. PATENT DOCUMENTS

| | | | |
|---|---|---|---|
| 2020/0127892 A1* | 4/2020 | Savalle | G06K 9/6268 |
| 2020/0153742 A1 | 5/2020 | Lee et al. | |
| 2020/0160100 A1* | 5/2020 | Mermoud | G06K 9/6218 |
| 2020/0162407 A1* | 5/2020 | Tillotson | H04L 43/16 |
| 2020/0374306 A1 | 11/2020 | Dai | |

FOREIGN PATENT DOCUMENTS

| | | | | |
|---|---|---|---|---|
| EP | 3306890 A1 * | 4/2018 | | G06N 20/00 |
| TW | I674777 B | 10/2019 | | |

OTHER PUBLICATIONS

Nevat et al., "Anomaly detection and attribution in networks with temporally correlated traffic", IEEE/ACM Transactions on Networking, vol. 26, No. 1, Feb. 2018, pp. 131-144.

Keegan et al., "A survey of cloud-based network intrusion detection analysis", Human-centric Computing and Information Sciences vol. 6, Article No. 19, 2016.

McGregor et al., "Flow clustering using machine learning techniques", Proceedings of the 5th International Passive and Active Network Measurement International Workshop, Apr. 2004.

Amor et al., "Naive bayes vs decision trees in intrusion detection systems", In Proceedings of the 2004 ACM Symposium on Applied Computing, SAC '04, 2004, ACM, pp. 420-424.

Zhao et al., "Detection of super sources and destinations in high-speed networks: Algorithms analysis and evaluation", IEEE Journal on Selected Areas in Communications, vol. 24, No. 10, pp. 1840-1852, Oct. 2006.

Sperotto, "Flow-Based Intrusion Detection", 2010, CTIT Ph.D.— thesis Series No. 10-180, Centre for Telematics and Information Technology, University of Twente, The Netherlands.

Taiwanese Office Action, dated Feb. 25, 2022, in a counterpart Taiwanese patent application, No. TW 109117089.

* cited by examiner

ANOMALY FLOW DETECTION DEVICE AND ANOMALY FLOW DETECTION METHOD

CROSS-REFERENCE TO RELATED APPLICATIONS

This application claims priority to R.O.C. Patent Application No. 109117089 titled "Anomaly flow detection device and anomaly flow detection method," filed on May 22, 2020, with the Taiwan Intellectual Property Office (TWO).

TECHNICAL FIELD

The present disclosure relates to an internet technology, and particularly, to an anomaly flow detection device and an anomaly flow detection method.

BACKGROUND

With the rapid increase in the demand for transferring large amounts of data to and from mobile communication devices, traditional mobile voice communication network has evolved into a network that communicates with Internet Protocol (IP) data packets. This type of IP data packet communication can provide users of mobile communication devices with IP-based voice, multimedia, multicast and on-demand communication services. A stable network traffic will make the above services more convenient, however, the amount of data required by the technology to detect network abnormalities is huge. For example, some technology so-called DPI (Deep Packet Inspection) needs to inspect the packet payload, which checks the contents of the packet, looks for a specific string or pattern string, and has privacy issues. Further, it may encounter encrypted packets that make it impossible to operate. Another technology uses flow-based features, which needs to collect a large number of packets to calculate statistical features between packets. The disadvantage is that in addition to the high complexity required to calculate these statistical features, the detection time will also be dragged down, because it must wait until the end of the stream to start computing the statistical features of the entire stream.

In light of this, how to provide an abnormal flow detection mechanism that can effectively detect abnormal flow is a technical problem that the industry and academia need to solve urgently.

SUMMARY

The present disclosure provides an anomaly flow detection device and an anomaly flow detection method for the network. The device and the method use the packet IP header information in the network traffic to train machine learning to determine whether a specific network flow follows its normal behavior features, that is, packet features. If the packet features of the specific network traffic do not match the normal behavior features, the network traffic will be identified as abnormal traffic.

In order to achieve the above object, one embodiment of the present invention provides an anomaly flow detection device. The device may comprise a network interface, a storage, and a processor electrically connected to the network interface and the storage. The processor can perform the following steps of retrieving a plurality of training data transmitted between a monitored network and an external network in a first time interval through the network interface; preprocessing a plurality of packet headers of the pluralities of training data to obtain a plurality of training feature vectors and storing them in the storage; constructing a flow recognition model with an unsupervised learning method and storing it in the storage; inputting the pluralities of training feature vectors to the flow recognition model to train the flow recognition model; retrieving a plurality of testing data transmitted between the monitored network and the external network through the network interface; preprocessing a plurality of packet headers of the pluralities of testing data to obtain a plurality of testing feature vectors and storing them in the storage; inputting the pluralities of testing feature vectors to the flow recognition model to identify whether the pluralities of packet headers of the pluralities of testing data are normal or abnormal; and determining the flow of the monitored network is abnormal by calculating an abnormal index according to the recognition result of the flow recognition model.

According to some embodiments, the step of preprocessing the pluralities of packet headers of the pluralities of training data to obtain the pluralities of training feature vectors may comprise: choosing the packet headers of the pluralities of training data with certain feature types, in which the feature types comprises numerical features and non-numerical features; filling up fields of missing feature values of the feature types; standardizing the numerical features in the feature types to obtain first sub-features; converting the non-numerical features in the feature types to binary value features to obtain second sub-features; and obtaining the training feature vectors according to the first sub-features and the second sub-features.

According to some embodiments, the feature types of the packet headers of the pluralities of training data may comprise the numerical features and the non-numerical features, in which the numerical features may comprise an IP packet length, a TCP (Transmission Control Protocol) window size, a TCP header length, a TCP data length, a TCP urgent pointer, an UDP (User Datagram Protocol) length, an IP header length, and an IP time to live and the non-numerical features may comprise TCP flags, an IP type of service of IP (TOS), and IP flags.

According to some embodiments, the step of preprocessing the pluralities of packet headers of the pluralities of testing data to obtain the pluralities of testing feature vectors may comprise: choosing the packet headers of the pluralities of testing data with certain feature types, in which the feature types comprises numerical features and non-numerical features; filling up fields of missing feature values of the feature types; standardizing the numerical features in the feature types to obtain third sub-features; converting non-numerical features in the feature types to binary value features to obtain fourth sub-features; and obtaining the testing feature vectors according to the third sub-features and the fourth sub-features.

According to some embodiments, the feature types of the packet headers of the pluralities of testing data may comprise the numerical features and the non-numerical features, in which the numerical features may comprise an IP packet length, a TCP window size, a TCP header length, a TCP data length, a TCP urgent pointer, an UDP length, an IP header length, and an IP time to live and the non-numerical features may comprise TCP flags, an IP type of service (TOS), and IP flags.

According to some embodiments, the step of determining the flow of the monitored network is abnormal by calculating an abnormal index according to the recognition result of the flow recognition model may comprise: determining the flow of the monitored network is abnormal when the abnormal index is greater than or equal to an abnormal threshold.

According to some embodiments, the step of constructing a flow recognition model with an unsupervised learning method may comprise: constructing the flow recognition model with One-Class Support Vector Machine (OC-SVM) or Isolation Forest (IF) algorithm.

In order to achieve the above object, another embodiment of the present invention provides an anomaly flow detection method, which is performed by an anomaly flow detection device. The device may comprise a network interface, a storage, and a processor electrically connected to the network interface and the storage. The method may be performed by the processor and comprise the following steps of: retrieving a plurality of training data transmitted between a monitored network and an external network in a first time interval through the network interface; preprocessing a plurality of packet headers of the pluralities of training data to obtain a plurality of training feature vectors and storing them in the storage; constructing a flow recognition model with an unsupervised learning method and storing it in the storage; inputting the pluralities of training feature vectors to the flow recognition model to train the flow recognition model; retrieving a plurality of testing data transmitted between the monitored network and the external network through the network interface; preprocessing a plurality of packet headers of the pluralities of testing data to obtain a plurality of testing feature vectors and storing them in the storage; inputting the pluralities of testing feature vectors to the flow recognition model to identify whether the pluralities of packet headers of the pluralities of testing data are normal or abnormal; and determining the flow of the monitored network is abnormal by calculating an abnormal index according to the recognition result of the flow recognition model.

According to some embodiments, the step of preprocessing the pluralities of packet headers of the pluralities of training data to obtain the pluralities of training feature vectors may comprise: choosing the packet headers of the pluralities of training data with certain feature types, in which the feature types comprises numerical features and non-numerical features; filling up fields of missing feature values of the feature types; standardizing the numerical features in the feature types to obtain first sub-features; converting the non-numerical features in the feature types to binary value features to obtain second sub-features; and obtaining the training feature vectors according to the first sub-features and the second sub-features.

According to some embodiments, the feature types of the packet headers of the pluralities of training data may comprise the numerical features and the non-numerical features, in which the numerical features may comprise an IP packet length, a TCP window size, a TCP header length, a TCP data length, a TCP urgent pointer, an UDP length, an IP header length, and an IP time to live and the non-numerical features may comprise TCP flags, an IP type of service (TOS), and IP flags.

According to some embodiments, the step of preprocessing the pluralities of packet headers of the pluralities of testing data to obtain the pluralities of testing feature vectors may comprise: choosing the packet headers of the pluralities of testing data with certain feature types, in which the feature types comprises numerical features and non-numerical features; filling up fields of missing feature values of the feature types; standardizing the numerical features in the feature types to obtain third sub-features; converting the non-numerical features in the feature types to binary value features to obtain fourth sub-features; and obtaining the testing feature vectors according to the third sub-features and the fourth sub-features.

According to some embodiments, the feature types of the packet headers of the pluralities of testing data may comprise the numerical features and the non-numerical features, in which the numerical features may comprise an IP packet length, a TCP window size, a TCP header length, a TCP data length, a TCP urgent pointer, an UDP length, an IP header length, and an IP time to live and the non-numerical features may comprise TCP flags, an IP type of service (TOS), and IP flags.

According to some embodiments, the step of determining the flow of the monitored network is abnormal by calculating an abnormal index according to the recognition result of the flow recognition model may comprise: determining the flow of the monitored network is abnormal when the abnormal index is greater than or equal to an abnormal threshold.

According to some embodiments, the step of constructing a flow recognition model with an unsupervised learning method may comprise: constructing the flow recognition model with One-Class SVM (OC-SVM) or Isolation Forest (IF) algorithm.

Those of ordinary skill in the art will understand that although the following detailed description will be made with reference to the illustrated embodiments and drawings, the present invention is not limited to these embodiments. Rather, the scope of the present invention is broad, and it is intended to limit the scope of the present invention only through the scope of patent application.

BRIEF DESCRIPTION OF THE DRAWINGS

Exemplary embodiments will be more readily understood from the following detailed description when read in conjunction with the appended drawings, in which.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
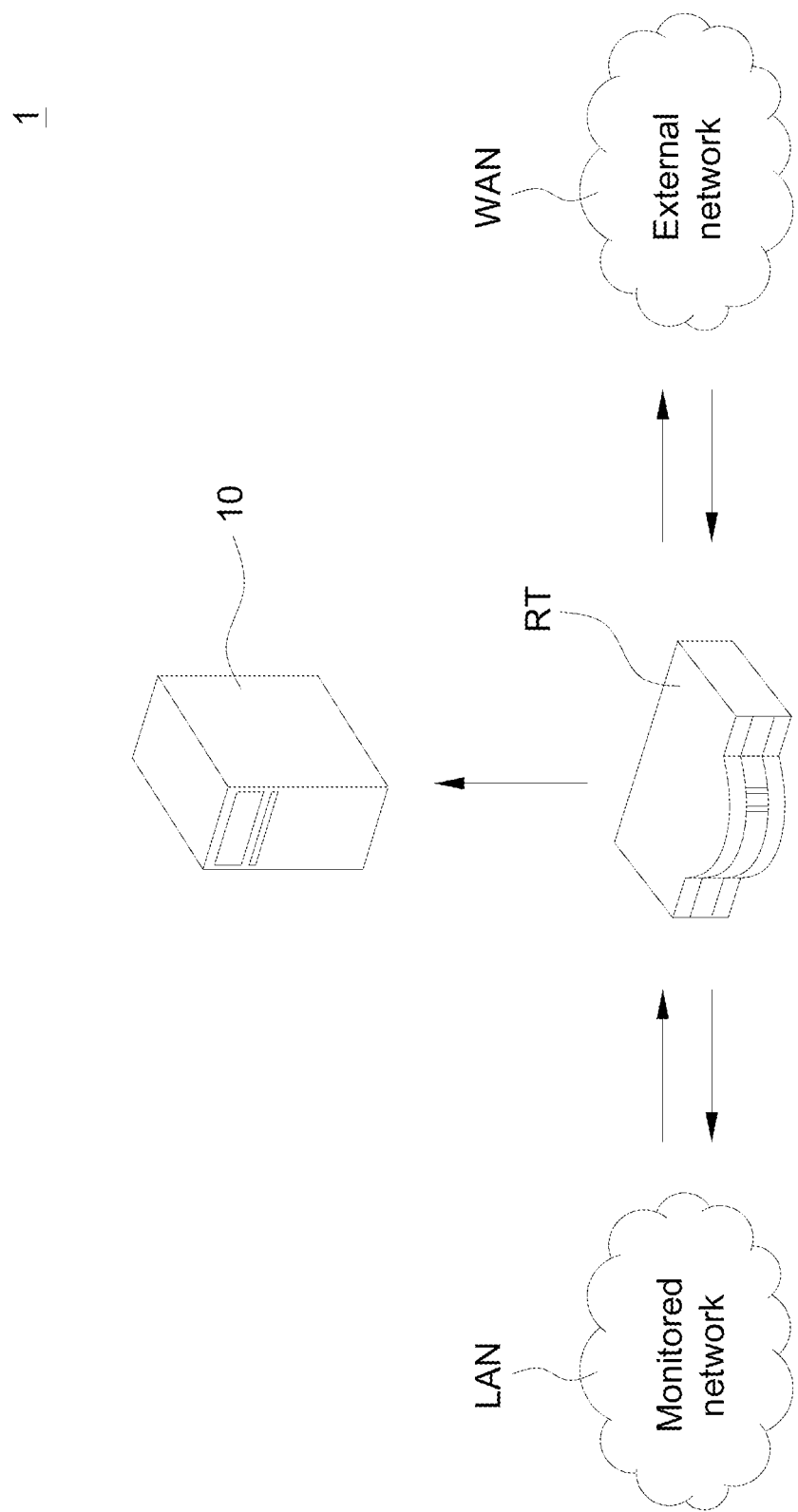
FIG. 1 depicts schematic view of an anomaly flow detection system according to one embodiment of the present disclosure.

Please refer to FIG. 1. FIG. 1 depicts schematic view of an anomaly flow detection system 1 according to one embodiment of the present disclosure. The anomaly flow detection system 1 may comprise an anomaly flow detection device 10, a router RT, a monitored network LAN (Local Area Network), and an external network WAN (Wide Area Network). The anomaly flow detection device 10 may be arranged in a computer apparatus, in which the computer apparatus may comprise a user equipment and a network apparatus. The user equipment includes, without limitation, computers, smart phones, PDAs (Personal Digital Assistants), etc. The network equipment includes, without limitation, a single network server and a server group composed of multiple network servers. The computer equipment can run alone to realize the present invention, or it can be implemented through the interactive operation of the router RT and other computer equipment in other networks, such as the monitored network LAN or the external network WAN. The network where the computer equipment is located includes, without limitation, the Internet, wide area network, metropolitan area network, local area network, VPN (Virtual Private Network), etc.

According to one embodiment, the anomaly flow detection device 10 can receive packet data transmitted between the monitored network LAN and the external network WAN through the router RT, and construct a flow recognition model to analyze the packet data, so as to determine whether the network flow of the monitored network LAN is abnormal.

According to another one embodiment, the anomaly flow detection device 10 may also be integrated into the router RT or arranged in the monitored network LAN. The anomaly flow detection method performed by the anomaly flow detection device 10 will be described below.

Figure 2:
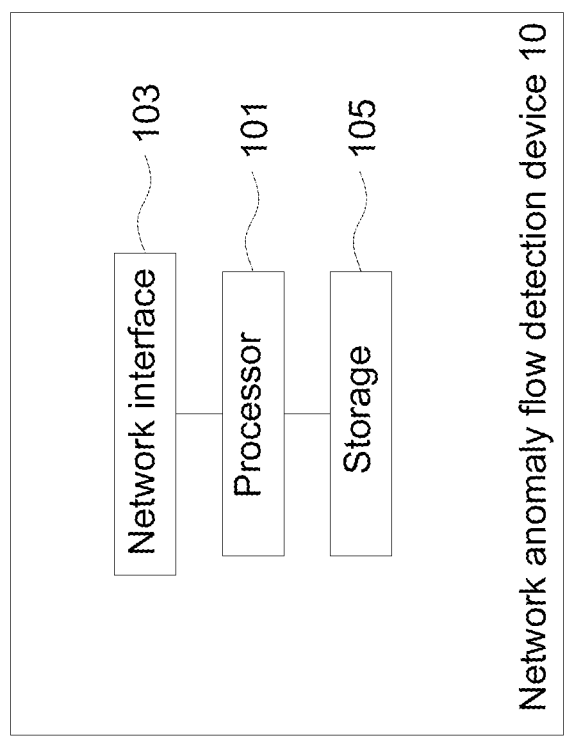
FIG. 2 depicts a schematic view of an anomaly flow detection device according to one embodiment of the present disclosure.
Figure 3:
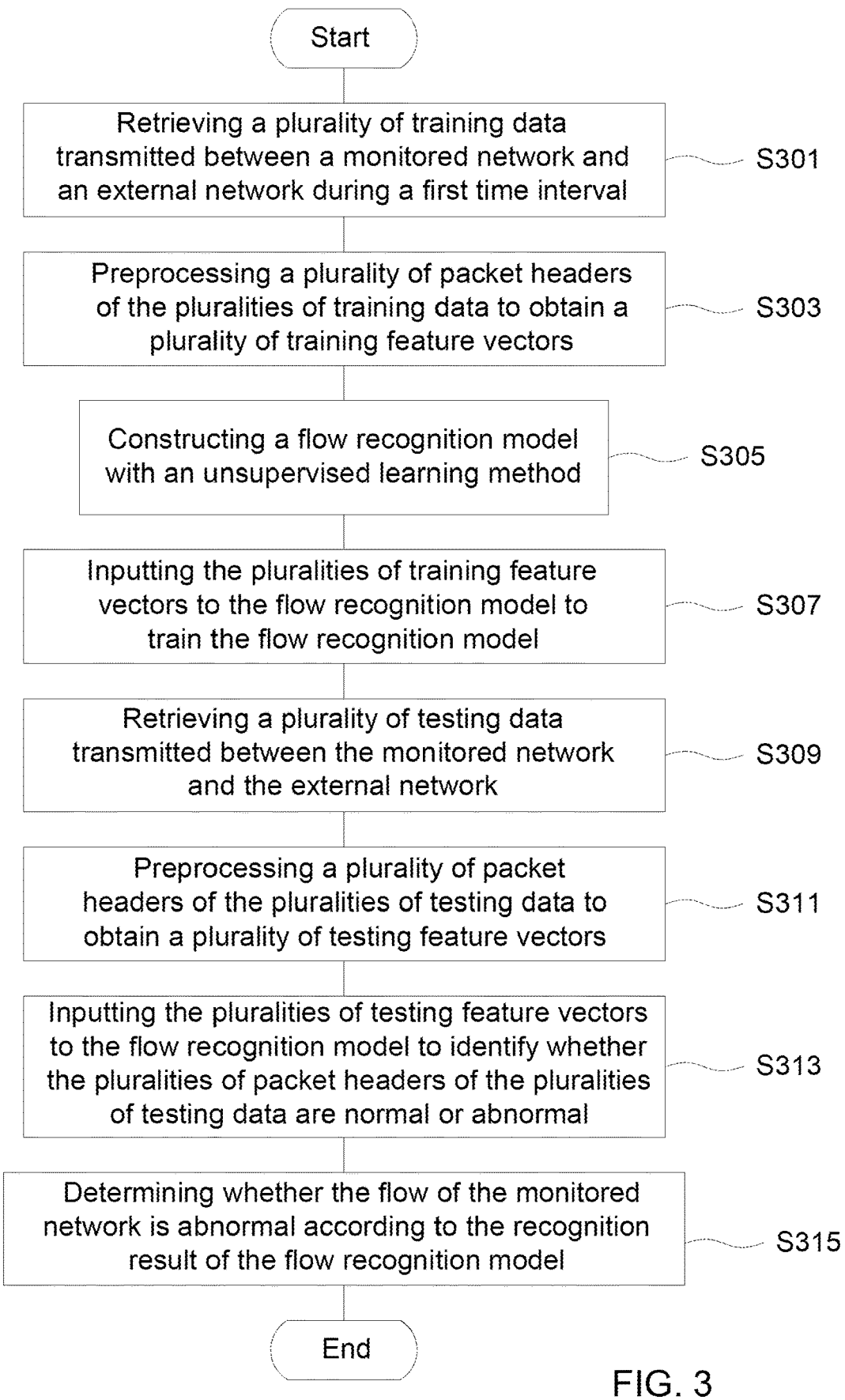
FIG. 3 depicts a flow chart of an anomaly flow detection method according to one embodiment of the present disclosure.
Figure 4:
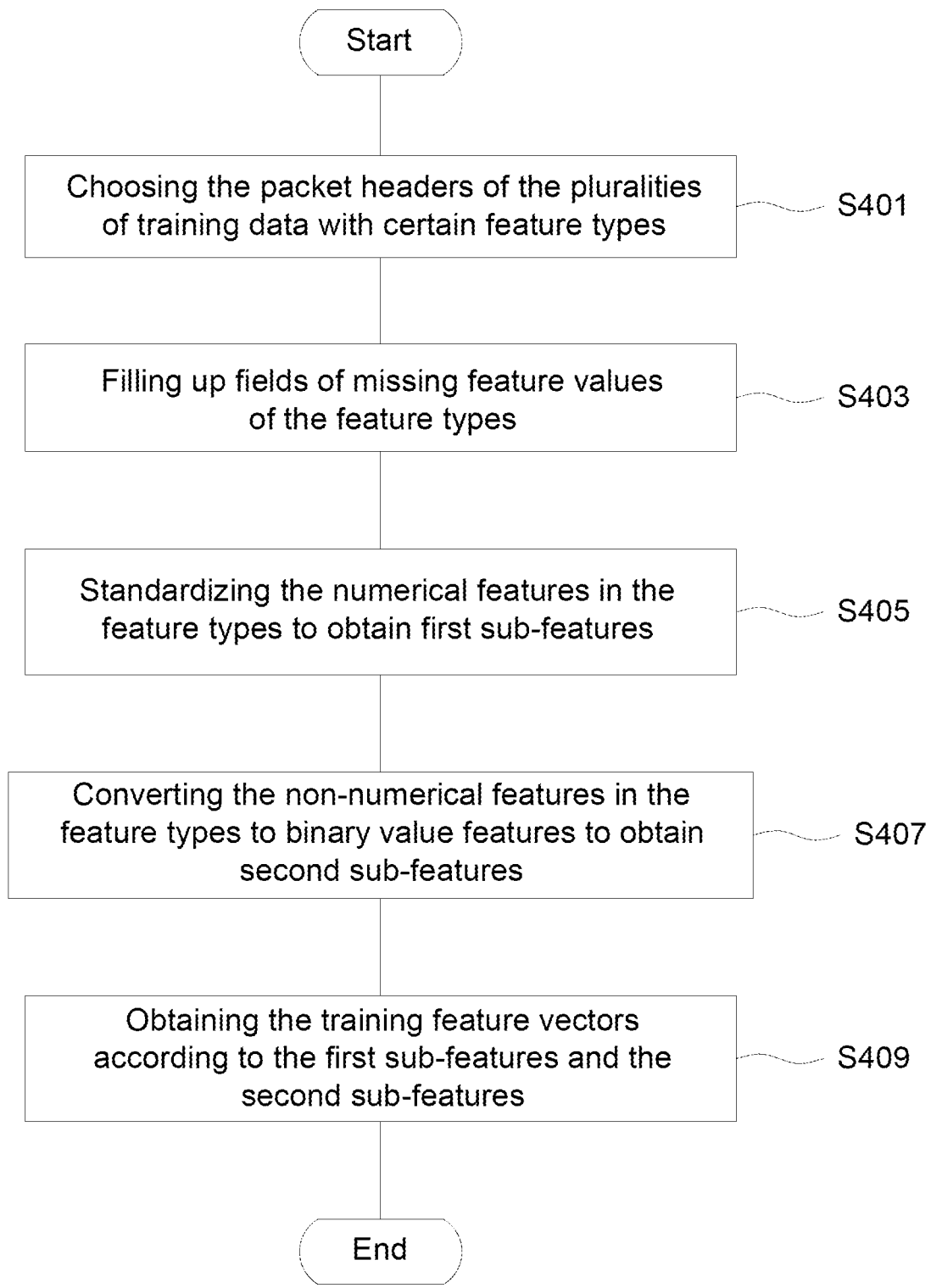
FIG. 4 depicts a flow chart of the steps of preprocessing the training data according to one embodiment of the present disclosure.
Figure 5:
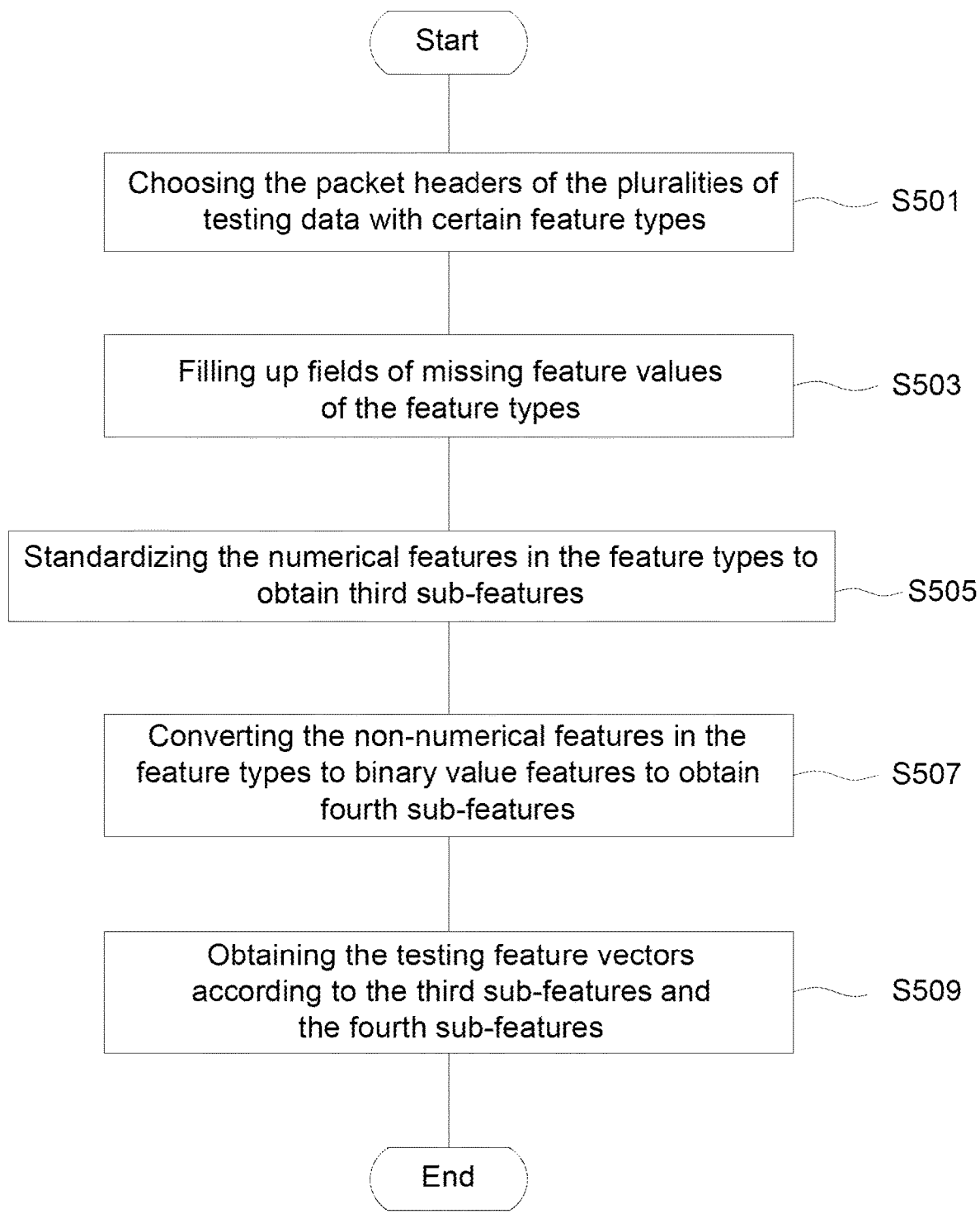
FIG. 5 depicts a schematic view of a flow chart of the steps of preprocessing the testing data according to one embodiment of the present disclosure.

In conjunction with FIG. 1, FIG. 2 depicts a schematic view of an anomaly flow detection device according to one embodiment of the present disclosure, FIG. 3 depicts a flow chart of an anomaly flow detection method according to one embodiment of the present disclosure, FIG. 4 depicts a flow chart of the steps of preprocessing the training data according to one embodiment of the present disclosure, and FIG. 5 depicts a schematic view of a flow chart of the steps of preprocessing the testing data according to one embodiment of the present disclosure.

The anomaly flow detection device 10 may comprise a processor 101, a network interface 103, and a storage 105, in which the processor 101 may be electrically connected to the network interface 103 and the storage 105. The steps of detecting whether the network flow of the monitored network LAN by the anomaly flow detection device 10 is abnormal can be roughly divided into a training phase and a testing phase.

The training phase may comprise the steps of retrieving a plurality of training data transmitted between a monitored network LAN and an external network WAN during a first time interval through the network interface 103 by the processor 101 (S301), in which the pluralities of training data are packet data; and preprocessing a plurality of packet headers of the pluralities of training data to obtain a plurality of training feature vectors of the training data and storing the pluralities of training feature vectors in the storage 105 by the processor 101 (S303).

The step of S303 may comprise the step of choosing the packet headers of the pluralities of training data with certain feature types by the processor 101 (S401), in which the feature types comprise numerical features and non-numerical features. The packet headers may be represented in the form of a vector, such as the j-th feature type in the i-th data is represented by $r_{i,j}$, in which i=1, 2, . . . , M (M is the total number of packets of data in the collected training data), and j=1, 2, . . . , N (N is the number of features used for training). The packet headers with numerical features chosen in the present embodiment may comprise, without limitation, a TCP window size, a TCP header length, a TCP data length, a TCP urgent pointer, an UDP length, an IP header length, and an IP time to live ($r_{i,5}$, $r_{i,6}$, $r_{i,8}$, $r_{i,9}$, $r_{i,10}$, $r_{i,11}$, $r_{i,13}$, $r_{i,15}$). The packet headers with non-numerical features chosen in the present embodiment may comprise, without limitation, TCP flags, an IP type of service (TOS), and IP flags ($r_{i,7}$, $r_{i,12}$, $r_{i,14}$).

When using TCP protocol to transmit packet data (training data, testing data), the value of feature $r_{i,11}$ in the data is a missing feature value, such as the UDP length. If using UDP protocol to transmit packet data (training data, testing data), the values of the features $r_{i,6}$, $r_{i,7}$, $r_{i,8}$, $r_{i,9}$, $r_{i,10}$ in the data are missing feature values, such as TCP window size, TCP flags, the TCP header length, TCP data length, and the TCP urgent pointer. In order to avoid too many missing feature values in the training data, the step of S303 may further comprise the steps of filling up fields of missing feature values of the feature types by the processor 101 (S403), for example, filling up the missing feature values with "−1".

For the packet headers with the numerical features in the training data, the processor 101 may scale the feature value according to the following formula. The step of S303 may further comprise the steps of standardizing the numerical features in the packet headers of the pluralities of training data to obtain first sub-features by the processor 101 (S405), for example, using the min-max normalization to process the features in training data. The processed training data is used as the first sub-features $\hat{r}_{i,j}$, $\hat{r}_{i,j}$ may be presented a distribution with a standard deviation of 1 and a mean of 0, in which is the standardized result of $r_{i,j}$. The first sub-features $\hat{r}_{i,j}$ may be approached to the standard normal distribution. The example of the first sub-features $\hat{r}_{i,j}$ may be $\hat{r}_{i,5}$, $\hat{r}_{i,6}$, $\hat{r}_{i,8}$, $\hat{r}_{i,9}$, $\hat{r}_{i,10}$, $\hat{r}_{i,11}$, $\hat{r}_{i,13}$, $\hat{r}_{i,15}$.

For the packet headers with the non-numerical features in the training data, the step of S303 may further comprise the steps of converting the non-numerical features in the packet headers of the pluralities of training data to binary value features to obtain second sub-features by the processor 101 (S407). For example, the feature value of the packet headers of the non-numerical feature chosen by the processor 101 may be read by Wireshark (a packet analyzer) in hexadecimal. Therefore, the processor 101 may convert n-bit non-numerical features from hexadecimal into binary, and then convert them into n 1-bit sub-features, such that non-numerical features may be represented as sub-features. For example, the feature value of 6-bit TCP flags of one training data $r_{i,7}$ is 0x18, which would be converted into a vector [0, 1, 1, 0, 0, 0] represented in a column. Therefore, the feature value of $r_{i,7}$ would be converted into TCP flag sub-feature $[r_{i,7,0}, r_{i,7,1}, r_{i,7,2}, r_{i,7,3}, r_{i,7,4}, r_{i,7,5}]$. Likewise, the feature value of a 8-bit IP DS (Differentiated Services) field of one training data $r_{i,12}$ would be converted into IP DS field sub-feature $[r_{i,12,0}, r_{i,12,1}, r_{i,12,2}, r_{i,12,3}, r_{i,12,4}, r_{i,12,5}, r_{i,12,6}, r_{i,12,7}]$, and the feature value of 3-bit IP flags of one training data $r_{i,14}$ would be converted into IP flags sub-feature $[r_{i,14,0}, r_{i,14,1}, r_{i,14,2}]$. The second sub-features ř are composed of the TCP flag sub-feature, the IP DS field sub-feature and the IP flags sub-feature.

Next to the step S407, the step of S303 may further comprise the steps of constituting the training feature vectors $f_i=(f_{i,0}, f_{i,1}, f_{i,2}, \ldots, f_{i,24})=(r_{i,7,0}, r_{i,7,1}, r_{i,7,2}, r_{i,7,3}, r_{i,7,4}, r_{i,7,5}, r_{i,12,0}, r_{i,12,1}, r_{i,12,2}, r_{i,12,3}, r_{i,12,4}, r_{i,12,5}, r_{i,12,6}, r_{i,12,7}, r_{i,14,0}, r_{i,14,1}, r_{i,14,2}, \hat{r}_{i,5}, \hat{r}_{i,6}, \hat{r}_{i,8}, \hat{r}_{i,9}, \hat{r}_{i,10}, \hat{r}_{i,11}, \hat{r}_{i,13}, \hat{r}_{i,15})$ according to the first sub-features $\hat{r}_{i,j}$ according to step S405 and the second sub-features ř according to the step S407 (S409), in which $f_{i,j}$ is the j-th feature of the i-th training data.

Next to the step S303, the training phase may further comprise the steps of constructing a flow recognition model with an unsupervised learning method by the processor 101 (S305). For example, the flow recognition model may be constructed with One-Class SVM (OC-SVM) algorithm or Isolation Forest (IF) algorithm.

Next to the step S305, the training phase may further comprise the steps of inputting the pluralities of training feature vectors $f_i$ to the flow recognition model to train the flow recognition model by the processor 101 (S307). The above mentioned steps S301 to S307 complete the training phase.

Next to the step S307, for detecting whether the network flow of the monitored network LAN is abnormal, the operation of the processor 101 enters the testing phase. The testing phase may comprise the steps of retrieving a plurality of testing data transmitted between the monitored network LAN and the external network WAN during a second time interval through the network interface 103 by the processor 101 (S309), in which the pluralities of testing data are packet data; and preprocessing a plurality of packet headers of the pluralities of testing data to obtain a plurality of testing feature vectors of the testing data and storing the pluralities of testing feature vectors in the storage 105 by the processor 101 (S311). The steps S307 to S311 are similar with the steps S301 to S305, and the steps S501 to S509 of the step S311 for preprocessing the pluralities of the packet headers of the pluralities of testing data are similar with the steps S401 to S409 Likewise, third sub-features are obtained by standardizing the numerical features in the packet headers of the pluralities of testing data (S505), fourth sub-features are obtained by converting the non-numerical features in the packet headers of the pluralities of testing data to binary value features (S507), and the testing feature vectors are obtained according to the third sub-features and the fourth sub-features (S509).

Next to step S311, the testing phase may further comprise the steps of inputting the pluralities of testing feature vectors from the storage 105 to the flow recognition model to identify whether the pluralities of packet headers of the pluralities of testing data are normal or abnormal by the processor 101 (S313). More specifically, the processor 101 identifies whether the pluralities of packet headers of the pluralities of testing data are normal or abnormal according to an output value from the flow recognition model belongs to a set {0,1}, such as 0 means normal, and 1 means abnormal.

Figure 6:
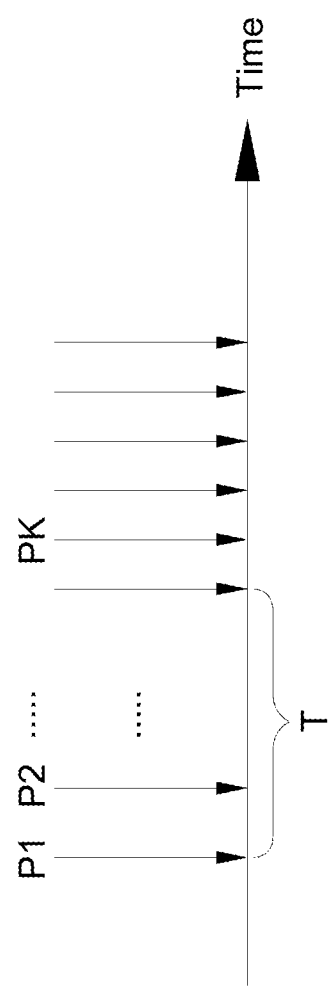
FIG. 6 depicts a timing diagram of the testing data according to one embodiment of the present disclosure.

Finally, next to step S313, the anomaly flow detection method may further comprise the step of determining whether the flow of the monitored network LAN is abnormal according to the recognition result of the flow recognition model (S315). More specifically, please refer to FIG. 6, if there are M packets judged to be abnormal in the K packets of the testing data during a detection period T by the flow recognition model, the abnormal index is M/K. When the abnormal index is greater than or equal to an abnormal threshold S, the flow of the monitored network is judged as abnormal, in which the abnormal threshold S may be between 0.1 and 0.9, without limitation.

Above all, the anomaly flow detection device and the method of anomaly flow detection thereof of the present disclosure can inspect the first K packets in the time intervals to determine whether the flow of the monitored network is abnormal according to the recognition result of the flow recognition model. Therefore, the payload is small, the complexity is low, and there is no need to wait for the end of the entire stream, so the speed is faster, that is, the network manager can be notified via email or text message in the shortest time.

While various embodiments in accordance with the disclosed principles are described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s), and their equivalents, that are protected thereby. In all instances, the scope of such claims shall be considered on their own merits in light of this disclosure, but should not be constrained by the headings herein.

What is claimed is:

1. An anomaly flow detection device comprising:
    a network interface;
    a storage; and
    a processor electrically connected to the network interface and the storage;
    wherein the processor performs the following steps:
    retrieving a plurality of training data transmitted between a monitored network and an external network in a first time interval through the network interface;

preprocessing a plurality of packet headers of the pluralities of training data to obtain a plurality of training feature vectors and storing them in the storage, comprising steps of:
  choosing the packet headers of the pluralities of training data with certain feature types, in which the feature types comprises numerical features and non-numerical features;
  filling up fields of missing feature values of the feature types;
  standardizing the numerical features in the feature types to obtain first sub-features;
  converting the non-numerical features in the feature types to binary value features to obtain second sub-features; and
  obtaining the training feature vectors according to the first sub-features and the second sub-features;
constructing a flow recognition model with an unsupervised learning method and storing it in the storage;
inputting the pluralities of training feature vectors to the flow recognition model to train the flow recognition model;
retrieving a plurality of testing data transmitted between the monitored network and the external network through the network interface;
preprocessing a plurality of packet headers of the pluralities of testing data to obtain a plurality of testing feature vectors and storing them in the storage;
inputting the pluralities of testing feature vectors to the flow recognition model to identify whether the pluralities of packet headers of the pluralities of testing data are normal or abnormal; and
determining the flow of the monitored network is abnormal by calculating an abnormal index according to a recognition result of the flow recognition model.

2. The according to claim 1, wherein the feature types of the packet headers of the pluralities of training data comprises the numerical features and the non-numerical features, wherein the numerical features comprise an IP (Internet Protocol) packet length, a TCP (Transmission Control Protocol) window size, a TCP header length, a TCP data length, a TCP urgent pointer, an UDP (User Datagram Protocol) length, an IP header length, and an IP time to live and the non-numerical features comprises TCP flags, an IP type of service (TOS), and IP flags.

3. The according to claim 1, wherein the step of determining the flow of the monitored network is abnormal by calculating an abnormal index according to the recognition result of the flow recognition model comprises the following step: determining the flow of the monitored network is abnormal when the abnormal index is greater than or equal to an abnormal threshold.

4. The according to claim 1, wherein the step of constructing a flow recognition model with an unsupervised learning method comprises the following step: constructing the flow recognition model with One-Class Support Vector Machine (OC-SVM) or Isolation Forest (IF) algorithm.

5. An anomaly flow detection method performed by an anomaly flow detection device, wherein the device comprises a network interface, a storage, and a processor electrically connected to the network interface and the storage, and the method comprises the following steps:

retrieving a plurality of training data transmitted between a monitored network and an external network in a first time interval through the network interface;
preprocessing a plurality of packet headers of the pluralities of training data to obtain a plurality of training feature vectors and storing them in the storage, comprising steps of:
  choosing the packet headers of the pluralities of training data with certain feature types, in which the feature types comprises numerical features and non-numerical features;
  filling up fields of missing feature values of the feature types;
  standardizing the numerical features in the feature types to obtain first sub-features;
  converting the non-numerical features in the feature types to binary value features to obtain second sub-features; and
  obtaining the training feature vectors according to the first sub-features and the second sub-features;
constructing a flow recognition model with an unsupervised learning method and storing it in the storage;
inputting the pluralities of training feature vectors to the flow recognition model to train the flow recognition model;
retrieving a plurality of testing data transmitted between the monitored network and the external network through the network interface;
preprocessing a plurality of packet headers of the pluralities of testing data to obtain a plurality of testing feature vectors and storing them in the storage;
inputting the pluralities of testing feature vectors to the flow recognition model to identify whether the pluralities of packet headers of the pluralities of testing data are normal or abnormal; and
determining the flow of the monitored network is abnormal by calculating an abnormal index according to the recognition result of the flow recognition model.

6. The anomaly flow detection method according to claim 5, wherein the feature types of the packet headers of the pluralities of training data comprises the numerical features and the non-numerical features, wherein the numerical features comprise an IP (Internet Protocol) packet length, a TCP (Transmission Control Protocol) window size, a TCP header length, a TCP data length, a TCP urgent pointer, an UDP (User Datagram Protocol) length, an IP header length, and an IP time to live and the non-numerical features comprises TCP flags, an IP type of service (TOS), and IP flags.

7. The anomaly flow detection method according to claim 5, wherein the step of determining the flow of the monitored network is abnormal by calculating an abnormal index according to the recognition result of the flow recognition model comprises the following step: determining the flow of the monitored network is abnormal when the abnormal index is greater than or equal to an abnormal threshold.

8. The anomaly flow detection method according to claim 5, wherein the step of constructing a flow recognition model with an unsupervised learning method comprises the following step: constructing the flow recognition model with One-Class Support Vector Machine (OC-SVM) or Isolation Forest (IF) algorithm.

* * * * *